US012739289B2

(12) United States Patent
Miller et al.

(10) Patent No.: US 12,739,289 B2
(45) Date of Patent: Sep. 15, 2026

(54) SYSTEMS AND METHODS FOR MANAGING DIGITAL NOTES FOR COLLABORATION

(71) Applicant: 3M INNOVATIVE PROPERTIES COMPANY, St. Paul, MN (US)

(72) Inventors: Lisa M. Miller, Spring Valley, WI (US); Scott R. Fairbairn, Cottage Grove, MN (US); Heather M. Green, Woodbury, MN (US); Willem V. Bastiaens, Scandia, MN (US); Joseph C. Wintheiser, Oakdale, MN (US); Pontus Axelsson, Stockholm (SE); Michael Rotstein, Stockholm (SE); Emre B. Ergenekon, Solna (SE); Nicklas A. Ansman Giertz, New York, NY (US); Marina Visintini, Stockholm (SE)

(73) Assignee: 3M Innovative Properties Company, St. Paul, MN (US)

( * ) Notice: Subject to any disclaimer, the term of this patent is extended or adjusted under 35 U.S.C. 154(b) by 292 days.

(21) Appl. No.: 18/548,134

(22) PCT Filed: Mar. 2, 2022

(86) PCT No.: PCT/IB2022/051849

§ 371 (c)(1),
(2) Date: Aug. 28, 2023

(87) PCT Pub. No.: WO2022/200879

PCT Pub. Date: Sep. 29, 2022

(65) Prior Publication Data

US 2024/0146781 A1 May 2, 2024

Related U.S. Application Data

(60) Provisional application No. 63/166,515, filed on Mar. 26, 2021.

(51) Int. Cl.
*H04L 65/401* (2022.01)

(52) U.S. Cl.
CPC .................................. *H04L 65/401* (2022.05)

(58) Field of Classification Search
CPC . H04L 65/401; H04L 65/4015; H04L 65/403; H04L 67/025; H04L 67/1095
(Continued)

(56) References Cited

U.S. PATENT DOCUMENTS

| | | | |
|---|---|---|---|
| 5,818,513 | A | 10/1998 | Sano et al. |
| 11,176,522 | B2 | 11/2021 | Fukasawa |

(Continued)

FOREIGN PATENT DOCUMENTS

| | | |
|---|---|---|
| JP | 2006039800 A | 2/2006 |
| JP | 2007067535 A | 3/2007 |

(Continued)

OTHER PUBLICATIONS

International Search Report received for PCT International Application No. PCT/IB2022/051849, mailed on Jun. 1, 2022, 4 pages.

*Primary Examiner* — Glenford J Madamba
(74) *Attorney, Agent, or Firm* — Bryan L. Walker

(57) ABSTRACT

A method for collaboration using digital notes. A facilitator starts a session during a video conferencing with participants and can share a screen with the participants. The screen displays a code, a session ID, and a link. Participants join the session by scanning the code with a camera, entering the session ID, or accessing the link. During the session, the participants can create digital notes or scan physical notes to have them converted to digital notes. The facilitator then receives the digital notes sent from the participants during the session and moves the digital notes to a group on the facilitator's screen. Since the facilitator's screen is shared with the participants, any participant can view the digital
(Continued)

notes in the group from all of the participants for collaboration as controlled by the facilitator.

19 Claims, 8 Drawing Sheets

(58) Field of Classification Search
USPC .......................................................... 709/204
See application file for complete search history.

(56) References Cited

U.S. PATENT DOCUMENTS

| | | | | |
|---|---|---|---|---|
| 11,556,663 | B2 | 1/2023 | Yamazoe | |
| 12,314,560 | B2 | 5/2025 | Chaudhri et al. | |
| 2014/0282077 | A1* | 9/2014 | Wilson | G06F 40/166 715/826 |
| 2014/0297646 | A1 | 10/2014 | Bastiaens et al. | |
| 2015/0106754 | A1 | 4/2015 | Somasundaram et al. | |
| 2019/0297126 | A1* | 9/2019 | Graziano | H04L 51/08 |
| 2021/0352120 | A1* | 11/2021 | Masi | H04L 67/025 |

FOREIGN PATENT DOCUMENTS

| | | | |
|---|---|---|---|
| JP | 2007213447 | A | 8/2007 |
| JP | 2017091328 | A | 5/2017 |
| JP | 2019174894 | A | 10/2019 |

* cited by examiner

SYSTEMS AND METHODS FOR MANAGING DIGITAL NOTES FOR COLLABORATION

CROSS REFERENCE TO RELATED APPLICATIONS

This application is a national stage filing under 35 U.S.C. 371 of PCT/IB2022/051849, filed Mar. 2, 2022, which claims the benefit of U.S. Provisional Application No. 63/166,515, filed Mar. 26, 2021, the disclosures of which are incorporated by reference in their entireties herein.

BACKGROUND

Paper notes have been broadly used in recording, sharing, and communicating ideas and information. For example, during a collaboration session (e.g., brainstorming session), participants write down ideas on repositionable paper notes, whiteboard, or paper, and then share with one another. In addition, people commonly use notes throughout the day to memorialize information or content which the individual does not want to forget. As additional examples, people frequently use notes as reminders of actions or events to take in the future, such as to make a telephone call, revise a document or to fill out a time sheet.

Software programs currently exist which permit computer users to create a software-based note in a digital form and to utilize the digital note within a computing environment. For example, a computer user may create a digital note and "attach" the digital note to an electronic document a desktop or electronic workspace presented by the computing environment.

SUMMARY

A method for collaboration using notes includes starting a session by a facilitator for a session during a video conferencing meeting with participants using at least one of a code, a session ID, and a link. Participants are joined to the session when the participants scan the code with a camera, enter the session ID, or access the link. The facilitator receives digital notes sent from the participants during the session and moves the digital notes to a group viewable by the participants during the session. The session is closed when the session ends.

DETAILED DESCRIPTION

Overview

The present disclosure describes techniques for creating and manipulating software notes representative of physical notes. For example, techniques are described for recognizing physical notes present within a physical environment, capturing information therefrom and creating corresponding digital representations of the physical notes, referred to herein as digital notes or software-based notes. Further, at least some aspects of the present disclosure are directed to techniques for managing multiple notes.

In general, notes can include physical notes and digital notes. Physical notes generally refer to objects with a general boundary and recognizable content. Physical notes can include the resulting objects after people write, draw, or enter via other type of inputs on the objects, for example, paper, white board, or other objects accepting the inputs. By way of examples, physical notes can include hand-written repositionable paper notes, paper, or film, white-board with drawings, posters, and signs. In some cases, physical notes can be generated using digital means, e.g., printing onto printable repositionable paper notes or printed document. In some cases, one object can include several notes. For example, several ideas can be written on a piece of poster paper or a white-board. Physical notes can be two-dimensional or three dimensional. Physical notes can have various shapes and sizes. For example, a physical note may be a 3 inches×3 inches note; a physical note may be a 26 inches×39 inches poster; and a physical note may be a triangular metal sign. In some cases, physical notes have known shapes and/or sizes. Digital notes generally refer to digital objects with information and/or ideas. Digital notes can be generated using digital inputs. Digital inputs can include, for example, keyboards, touch screens, digital cameras, digital recording devices, stylus, digital pens, or the like. In some cases, digital notes may be representative of physical notes.

Note Management System

Figure 1A:
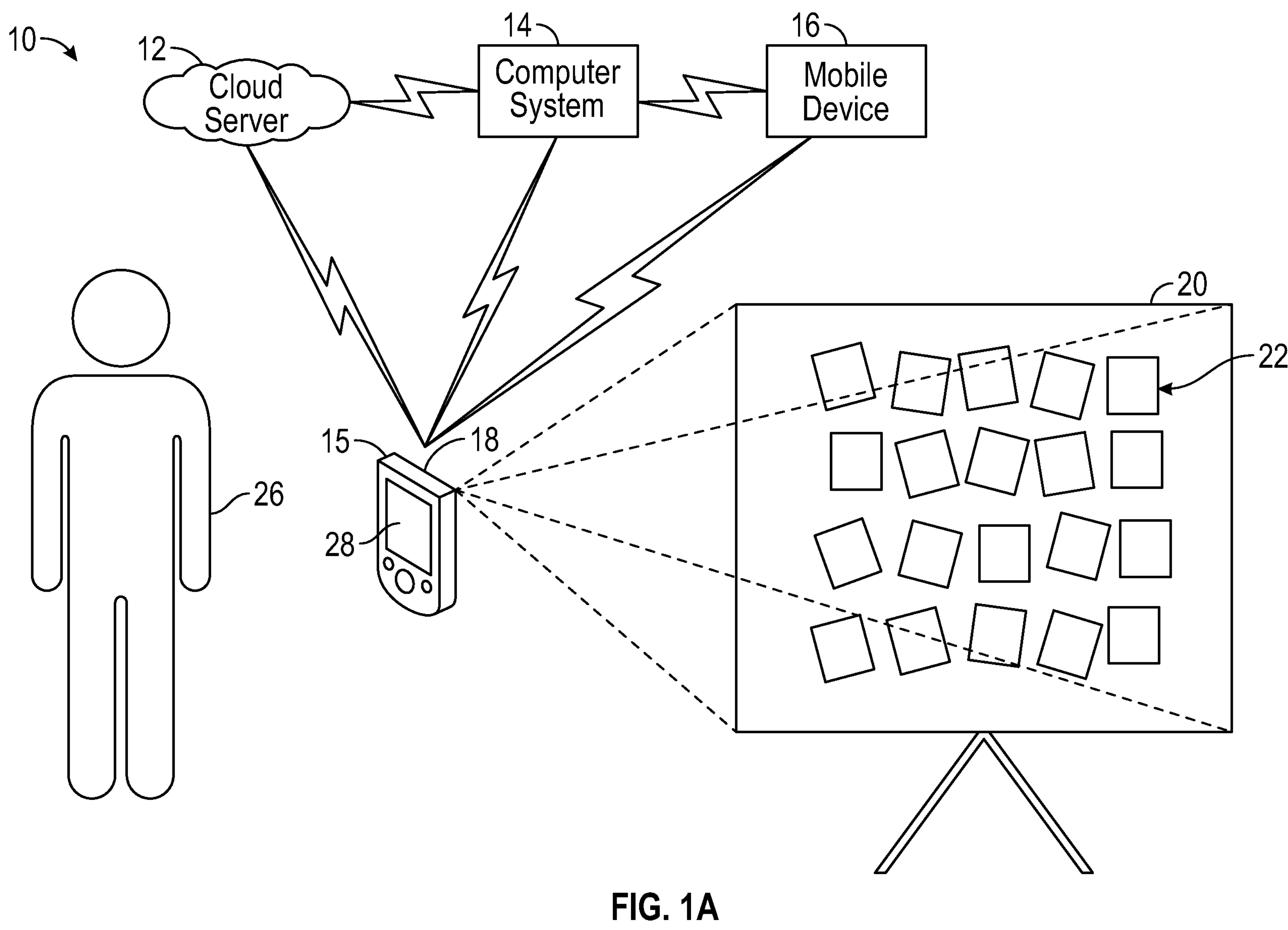
FIG. 1A is a representation illustrating one example of a user capturing an image of a workspace with notes using an image capture device on a mobile device.

FIG. 1A illustrates an example of a note recognition environment 10. In the example of FIG. 1A, environment 10 includes a mobile device 15 to capture and recognize one of more notes 22 from a workspace 20. As described herein, mobile device provides an execution environment for one or more software applications that, as described, can efficiently capture and extract note content from a large number of physical notes, such as the collection of notes 22 from workspace 20. In this example, notes 22 may be the results of a collaborative brainstorming session having multiple participants. As described, mobile device 15 and the software executing thereon may perform a variety of note-related operations, including automated creation of digital notes representative of physical notes 22 of workspace 20.

In the example implementation, mobile device 15 includes, among other components, an image capture device 18 and a presentation device 28. In addition, although not shown in FIG. 1A, mobile device 15 may include one or more processors, microprocessors, internal memory and/or data storage and other electronic circuitry for executing software or firmware to provide the functionality described herein.

In general, image capture device 18 is a camera or other component configured to capture image data representative of workspace 20 and notes 22 positioned therein. In other words, the image data captures a visual representation of an environment, such as workspace 20, having a plurality of visual notes. Although discussed as a camera of mobile device 15, image capture device 18 may comprise other components capable of capturing image data, such as a video recorder, an infrared camera, a CCD (Charge Coupled Device) array, a laser scanner, or the like. Moreover, the captured image data can include at least one of an image, a video, a sequence of images (i.e., multiple images taken within a time period and/or with an order), a collection of images, or the like, and the term input image is used herein to refer to the various example types of image data.

Presentation device 28 may include, but not limited to, an electronically addressable display, such as a liquid crystal display (LCD) or other type of display device for use with mobile device 28. In some implementations, mobile device 15 generates the content to display on presentation device 28 for the notes in a variety of formats, for example, a list, grouped in rows and/or column, a flow diagram, or the like. Mobile device 15 may, in some cases, communicate display information for presentation by other devices, such as a tablet computer, a projector, an electronic billboard or other external device.

As described herein, mobile device 15, and the software executing thereon, provide a platform for creating and manipulating digital notes representative of physical notes 22. For example, in general, mobile device 15 is configured to process image data produced by image capture device 18 to detect and recognize at least one of physical notes 22 positioned within workspace 20. In some examples, the mobile device 15 is configured to recognize note(s) by determining the general boundary of the note(s). After a note is recognized, mobile device 15 extracts the content of at least one of the one or more notes, where the content is the visual information of note 22.

In some example implementations, mobile device 15 provides functionality by which user 26 is able to export the digital notes to other systems, such as cloud-based repositories (e.g., cloud server 12) or other computing devices (e.g., computer system 14 or mobile device 16).

In the example of FIG. 1A, mobile device 15 is illustrated as a mobile phone. However, in other examples, mobile device 15 may be a tablet computer, a personal digital assistant (PDA), a laptop computer, a media player, an e-book reader, a wearable computing device (e.g., a watch, eyewear, a glove), or any other type of mobile or non-mobile computing device suitable for performing the techniques described herein.

Figure 1B:
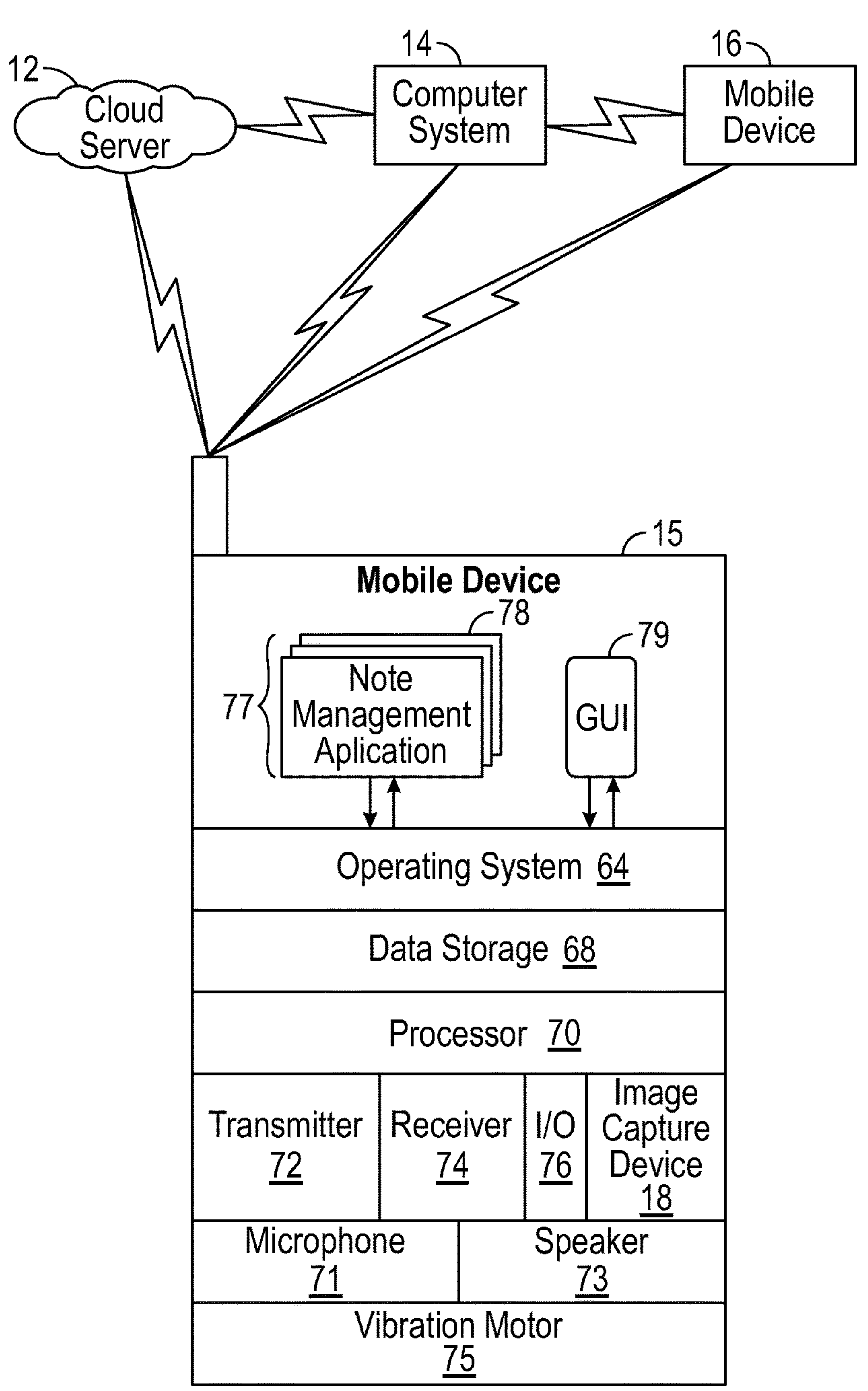
FIG. 1B is a block diagram illustrating one example of the mobile device.

FIG. 1B illustrates a block diagram illustrating an example of a mobile device that operates in accordance with the techniques described herein. For purposes of example, the mobile device of FIG. 1B will be described with respect to mobile device 15 of FIG. 1A In this example, mobile device 15 includes various hardware components that provide core functionality for operation of the device. For example, mobile device 15 includes one or more programmable processors 70 configured to operate according to executable instructions (i.e., program code), typically stored in a computer-readable medium or data storage 68 such as static, random-access memory (SRAM) device or Flash memory device. I/O 76 may include one or more devices, such as a keyboard, camera button, power button, volume button, home button, back button, menu button, or presentation device 28 as described in FIG. 1A. Transmitter 72 and receiver 74 provide wireless communication with other devices, such as cloud server 12, computer system 14, or other mobile device 16 as described in FIG. 1A, via a wireless communication interface as described in FIG. 1A, such as but not limited to high-frequency radio frequency (RF) signals. A microphone 71 converts audio information into corresponding electrical signals. A speaker 73 converts electrical signals into corresponding audio information. A vibration motor 75 is used to cause mobile device 15, or housing for it, to vibrate. Mobile device 15 may include additional discrete digital logic or analog circuitry not shown in FIG. 1B.

In general, operating system 64 executes on processor 70 and provides an operating environment for one or more user applications 77 (commonly referred to "apps"), including note management application 78. User applications 77 may, for example, comprise executable program code stored in computer-readable storage device (e.g., data storage 68) for execution by processor 70. As other examples, user applications 77 may comprise firmware or, in some examples, may be implemented in discrete logic.

In operation, mobile device 15 receives input image data and processes the input image data in accordance with the techniques described herein. For example, image capture device 18 may capture an input image of an environment having a plurality of notes, such as workspace 20 of FIG. 1A having of notes 22. As another example, mobile device 15 may receive image data from external sources, such as cloud server 15, computer system 14 or mobile device 16, via receiver 74. In general, mobile device 15 stores the image data in data storage 68 for access and processing by note management application 78 and/or other user applications 77.

As shown in FIG. 1B, user applications 77 may invoke kernel functions of operating system 64 to output a graphical user interface (GUI) 79 for presenting information to a user of mobile device. As further described below, note management application 78 may construct and control GUI 79 to provide an improved electronic environment for generating and manipulating corresponding digital notes representative of physical notes 22. For example, note management application 78 may construct GUI 79 to include mechanisms that allows user 26 to easily control events that are automatically triggered in response to capturing notes of certain characteristics. In addition, note management application 78 may construct GUI 79 to include mechanisms that allow user 26 to manage relationships between groups of the digital notes.

Figure 1C:
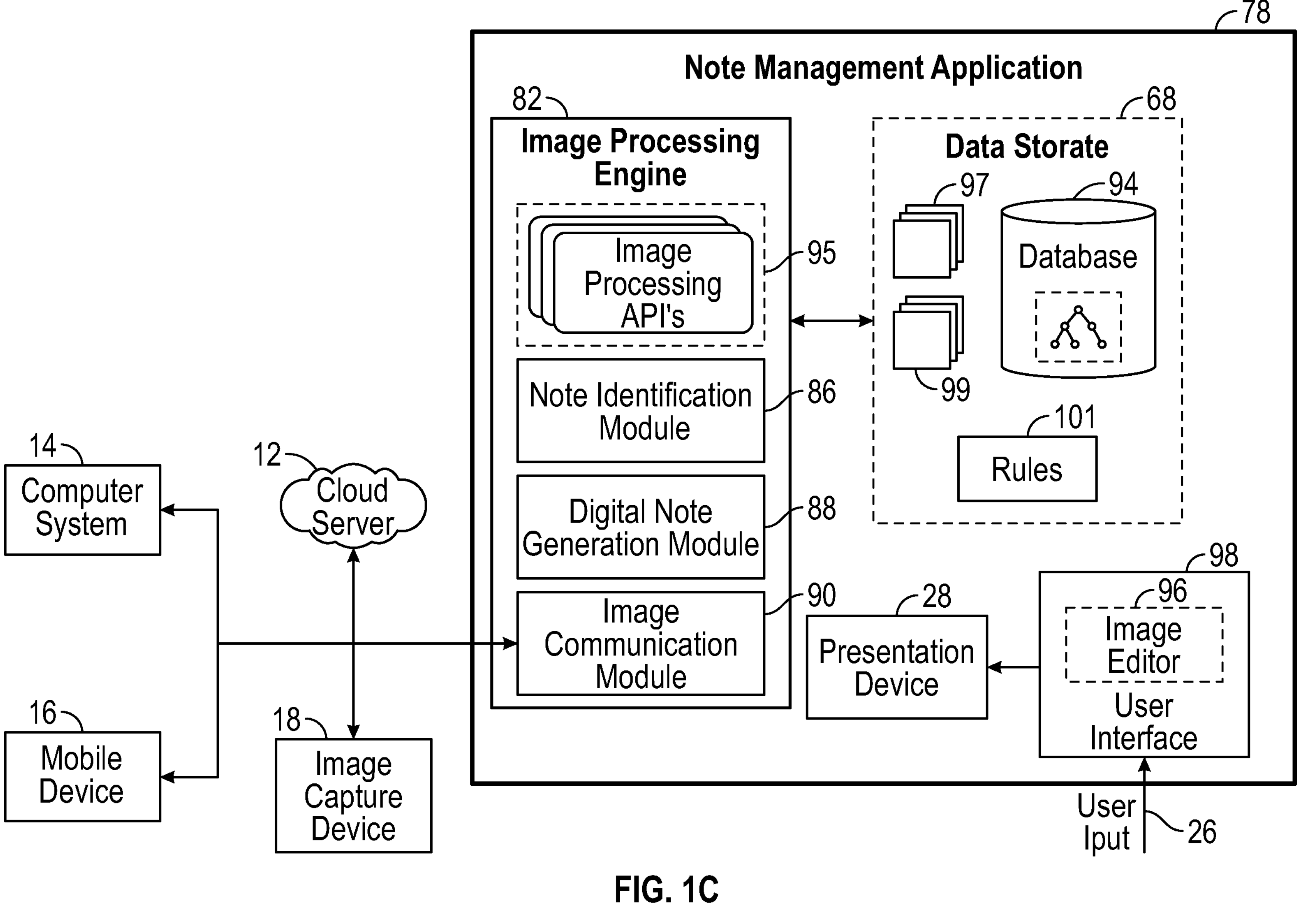
FIG. 1C is a block diagram illustrating one example of a note management application executing on the mobile device.

FIG. 1C is a block diagram illustrating one example implementation of note management application 78 that operates in accordance with the techniques described herein. Although described as a user application 77 executing on mobile device 15, the examples described herein may be implemented on any computing device, such as cloud server 12, computer system 14, or other mobile devices.

In this example, note management application 78 includes image processing engine 82 that provides image processing and object recognition functionality. Image processing engine 82 may include image communication module 90, note identification module 86 and digital note generation module 88. In addition, image processing engine 82 includes image processing Application Programming Interfaces (APIs) 95 that provide a library of image manipulation functions, e.g., image thresholding, masking, filtering, edge detection, and the like, for use by the other components of image processing engine 82.

In general, image data may be stored in data storage device 68. In this example, note management application 78 stores images 97 within data storage device 68. Each of images 97 may comprise pixel data for environments having a plurality of physical images, such as workspace 20 of FIG. 1A.

As described herein, note identification module 86 processes images 97 and identifies (i.e., recognizes) the plurality of physical notes in the images. Digital note generation module 88 generates digital notes 99 corresponding to the physical notes recognized within the images 97. For example, each of digital notes 99 corresponds to one of the physical notes identified in an input image 97. During this process, digital note generation module 88 may update database 94 to include a record of the digital note, and may store within the database information (e.g., content) extracted from the input image within boundaries determined for the physical note as detected by note identification module 86. Moreover, digital note generation module 88 may store within database 94 metadata associating the digital notes into one or more groups of digital notes.

Further, note management application 78 may be configured, e.g., by user input 26, to specify rules 101 that trigger actions in response to detection of physical notes having certain characteristics. For example, user interface 98 may, based on the user input, map action to specific characteristics of notes. Note management application 78 may output user interface 98 by which the user is able to specify rules having actions, such as a note grouping action, or an action related to another software application executing on the mobile device, such as an action related to a calendaring application. For each rule, user interface 98 allows the user to define criteria for triggering the actions. During this configuration process, user interface 98 may prompt the user to capture image data representative of an example note for triggering an action and process the image data to extract characteristics, such as color or content. User interface 98 may then present the determined criteria to the user to aid in defining corresponding rules for the example note.

Image communication module 90 controls communication of image data between mobile device 15 and external devices, such as cloud server 12, computer system 14, mobile device 16, or image capture device 18. In some examples, image communication module 90 may, for example, allow a user to communicate processed or unprocessed images 97 of environments and/or digital notes and associated information extracted therefrom including metadata from database 68. In some examples, image communication module 90 exports this data to a zip file that may be communicated by FTP, HTTP, email, Bluetooth or other mechanism.

In the example of FIG. 1C, note management application 78 includes user interface 98 that constructs and controls GUI 79 (FIG. 1B). As described below, user interface 98 may, in some examples, output for display an input image 97 overlaid with the plurality of digital notes 99, where each of the digital notes is overlaid in place of a corresponding physical note. In addition, user interface 98 may display a group of digital notes 99 that has been designated by the user. This group of digital notes 99 may be, for example, a subset of the digital notes recognized in a particular input image 97. User interface 98 may display this designated group (set) of the digital notes on a second portion of GUI 79 and allow user 26 to easily add or remove digital notes 99 from the designated group.

In some example implementations, user interface 98 provides an image editor 96 that allows a user to edit the overlay image and/or the digital notes. In another example, digital note generation module 88 may include a process or processes that enhances the extracted information from the input image.

Figure 1D:
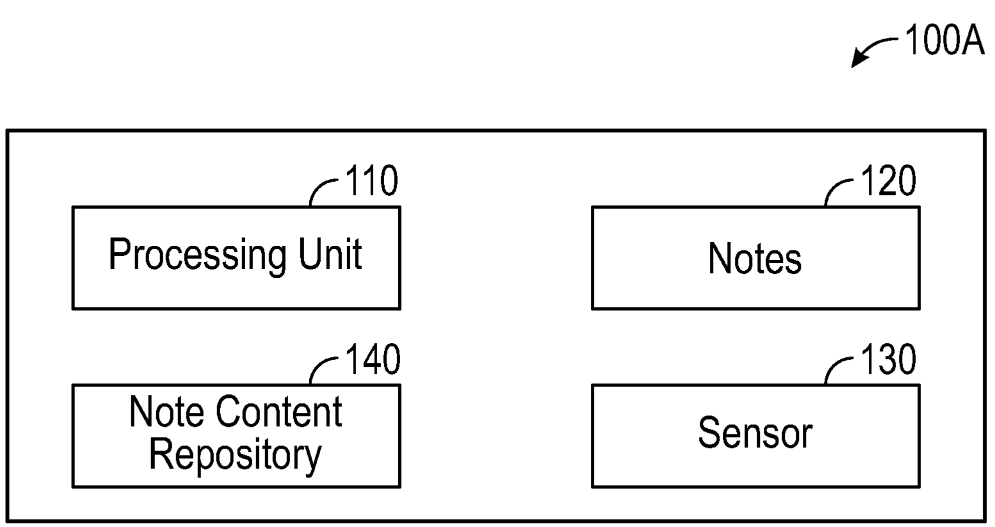
FIG. 1D illustrates another embodiment of a note recognition system.

FIG. 1D illustrates another example embodiment of a note recognition system 100A. The system 100A can include a processing unit 110, one or more notes 120, a sensor 130, and note content repository 140. The processing unit 110 can include one or more processors, microprocessors, computers, servers, and other computing devices. The sensor 130, for example, an image sensor, is configured to capture a visual representation of a scene having the one or more notes 120. The sensor 130 can include at least one of a camera, a video recorder, an infrared camera, a CCD (Charge Coupled Device) array, a scanner, or the like. The visual representation can include at least one of an image, a video, a sequence of images (i.e., multiple images taken within a time period and/or with an order), a collection of images, or the like. The processing unit 110 is coupled to the sensor 130 and configured to receive the visual representation. In some cases, the processing unit 110 is electronically coupled to the sensor 130. The processing unit 110 is configured to recognize at least one of the one or more notes 120 from the visual representation. In some embodiments, the processing unit 110 is configured to recognize note(s) by determining the general boundary of the note(s). After a note is recognized, the processing unit 110 extracts the content of the note. In some cases, the processing unit 110 is configured to recognize and extract the content of more than one note from a visual representation of a scene having those notes.

In some cases, the processing unit 110 can execute software or firmware stored in non-transitory computer-readable medium to implement various processes (e.g., recognize notes, extract notes, etc.) for the system 100A. The note content repository 140 may run on a single computer, a server, a storage device, a cloud server, or the like. In some other cases, the note content repository 140 may run on a series of networked computers, servers, or devices. In some implementations, the note content repository 140 includes tiers of data storage devices including local, regional, and central. The notes 120 can include physical notes arranged orderly or randomly in a collaboration space and the sensor 130 generates a visual representation of the notes 120 in the collaboration space.

In some implementations, the note recognition system 100A can include a presentation device (not shown in FIG. 1D) to show to the user which notes are recognized and/or which notes' content have been extracted. Further, the note recognition system 100A can present the extracted content via the presentation device. In some embodiments, the processing unit 110 can authenticate a note before extracting the content of the note. If the note is authenticated, the content will be extracted and stored in the note content repository 140.

Figure 1E:
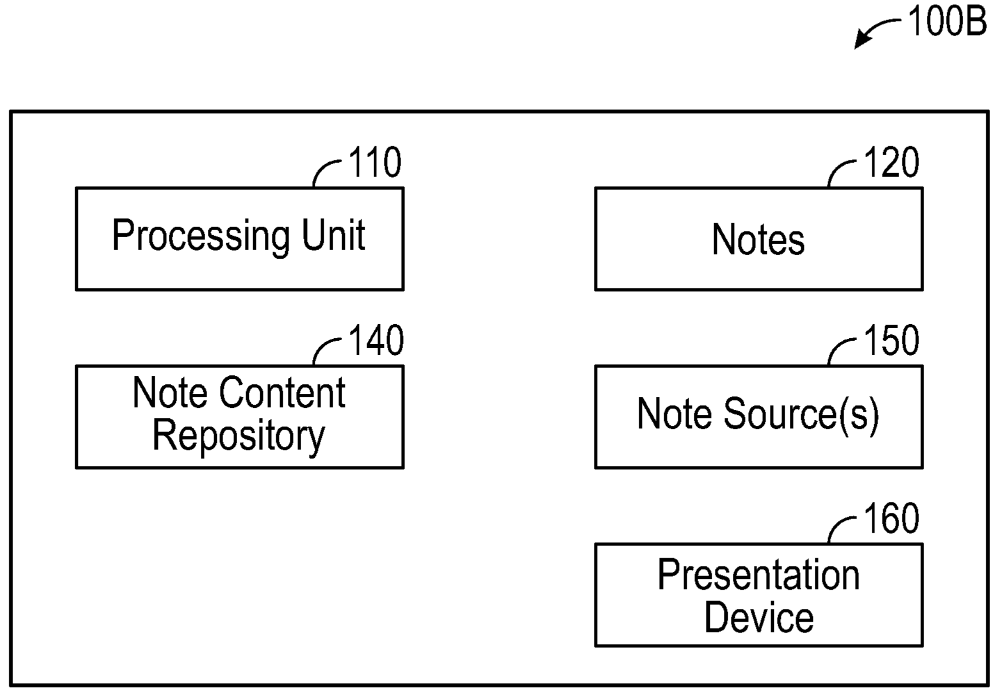
FIG. 1E illustrates another embodiment of a note management system.

FIG. 1E illustrates an embodiment of a note management system 100B. In this embodiment, the note management system 100B includes processing unit 110, one or more notes 120, one or more note sources 150, and a note content repository 140. In some cases, the system 100B includes a presentation device 160. The processing unit 110, the notes 120, and the note content repository 140 are similar to the components for the note recognition system 100A as illustrated in FIG. 1A. The note sources 150 can include sources to provide content of physical notes, such as a visual representation of a scene having one or more notes, and sources to provide content of digital notes, such as a data stream entered from a keyboard. In some embodiments, the note management system 100B includes a first source and a second source, and the first source is a visual representation of a scene having one or more notes 120. The first source and the second source are produced by different devices. The second source includes at least one of a text stream, an image, a video, a file, and a data entry. The processing unit 110 recognizes at least one of the notes from the first source and extracts the content of the note, as discussed in the note recognition system 100A. In some cases, the processing unit 110 labels the note with a category. The processing unit 110 can label a note based on its specific shape, color, content, and/or other information of the note. For example, each group of note can have a different color (e.g., red, green, yellow, etc.).

In some embodiments, the note management system 100B can include one or more presentation devices 160 to show the content of the notes 120 to the user. The presentation device 160 can include, but not limited to, an electronically addressable display, such as a liquid crystal display (LCD), a tablet computer, a projector, an electronic billboard, a cellular phone, a laptop, or the like. In some implementations, the processing unit 110 generates the content to display on the presentation device 160 for the notes in a variety of formats, for example, a list, grouped in rows and/or column, a flow diagram, or the like.

Various components of the note recognition system and note management system, such as processing unit, image sensor, and note content repository, can communicate via a communication interface. The communication interface includes, but not limited to, any wired or wireless short-range and long-range communication interfaces. The short-range communication interfaces may be, for example, local area network (LAN), interfaces conforming to a known communications standard, such as Bluetooth standard, IEEE 802 standards (e.g., IEEE 802.11), a ZigBee or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Collaboration Using Notes

A collaboration session allows participants to share digital notes within a group of participants as controlled by a facilitator who starts and runs the session. The facilitator receives digital notes from the participants and can organize them into groups in a board for viewing by participants of the session.

Figure 2:
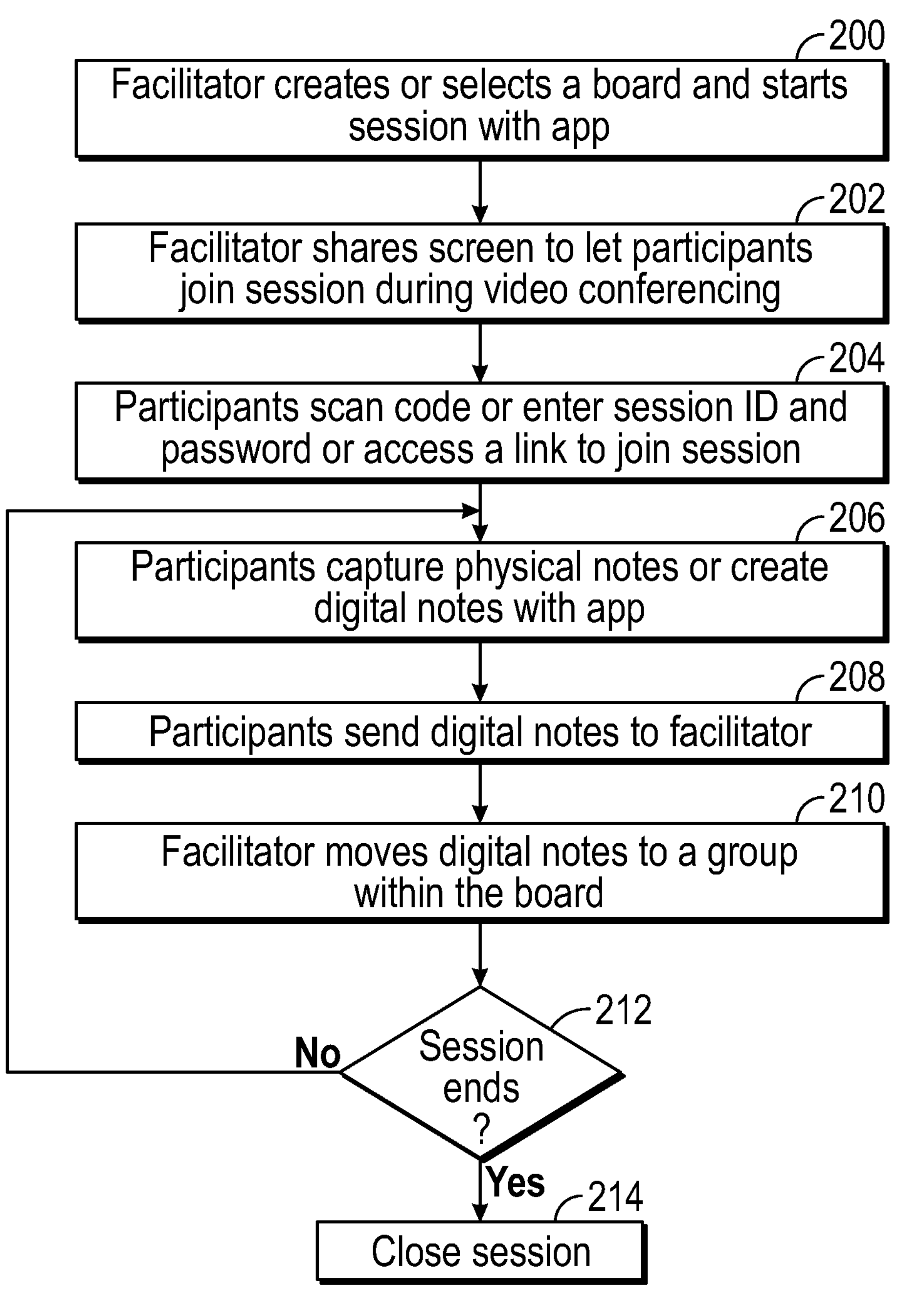
FIG. 2 is a flow chart of a method for conducting a collaboration session.

FIG. 2 is a flow chart of a method for conducting a collaboration session. This method can be implemented in software or firmware for execution by processor 70 in mobile device 15. This method includes the following, as further explained below. A facilitator creates or selects a board to start a session with the software application for this collaboration feature (step 200) and shares a screen to let participants join the session (step 202). The facilitator can share the screen with the participants during a video conferencing meeting via a network so that the facilitator's screen is viewable by the participants. Examples of video conferencing applications include the Teams product by Microsoft Corporation and the Zoom product by Zoom Video Communications, Inc. Alternatively, the facilitator can share a screen through a network connection that allows sharing or presenting a screen to the participants through the network connection.

Participants can then join the session by scanning a code displayed on the shared screen from the facilitator or by entering a session ID and optional password or by accessing a link (step 204). The password is optional in that a session can be conducted without the password, or the password can be part of the session ID. The code can be, for example, a Quick Response (QR) code or an App Clip code. The link can be, for example, a network link or an Internet web address link. Joining the session can also cause the opening of a software application on the participant devices, where the software application allows the participants to create digital notes or convert physical notes to corresponding digital notes, for example the software application described above in the Note Management System section. Also, joining the session electronically connects the participants' devices to the facilitator's device via a network link such as an Internet web address.

During the session, participants can capture physical notes with the software application to have them converted to corresponding digital notes or create digital notes using the software application (step 206). The participants can then send digital notes to the facilitator (step 208) via the network link, and the facilitator can move the notes to a group within the board (step 210). The group is viewable by all the participants, since the facilitator has shared the screen with the participants, in order for each of the participants to collaborate by viewing notes submitted by the other participants.

As the session continues (step 212), participants can continue to send digital notes to the facilitator for inclusion within the board viewable by the participants (steps 206, 208, 210). When the session ends (step 212), the facilitator closes the session or the session can automatically close based upon a timer for the session expiring (step 214).

As an alternative to step 202, sharing the facilitator's screen is optional in that the session can be conducted without screen sharing. In that alternative case, the participants can join the session in the same or a similar manner by scanning a code viewable by them or entering the session ID or accessing the link, and the facilitator can move the received digital notes to a group viewable by the participants or possibly send the received notes to the participants at a later time in the session or when the session ends or after the session ends. The digital notes can be sent in, for example, an electronic document such as a portable document format (PDF) file.

Figure 3A:
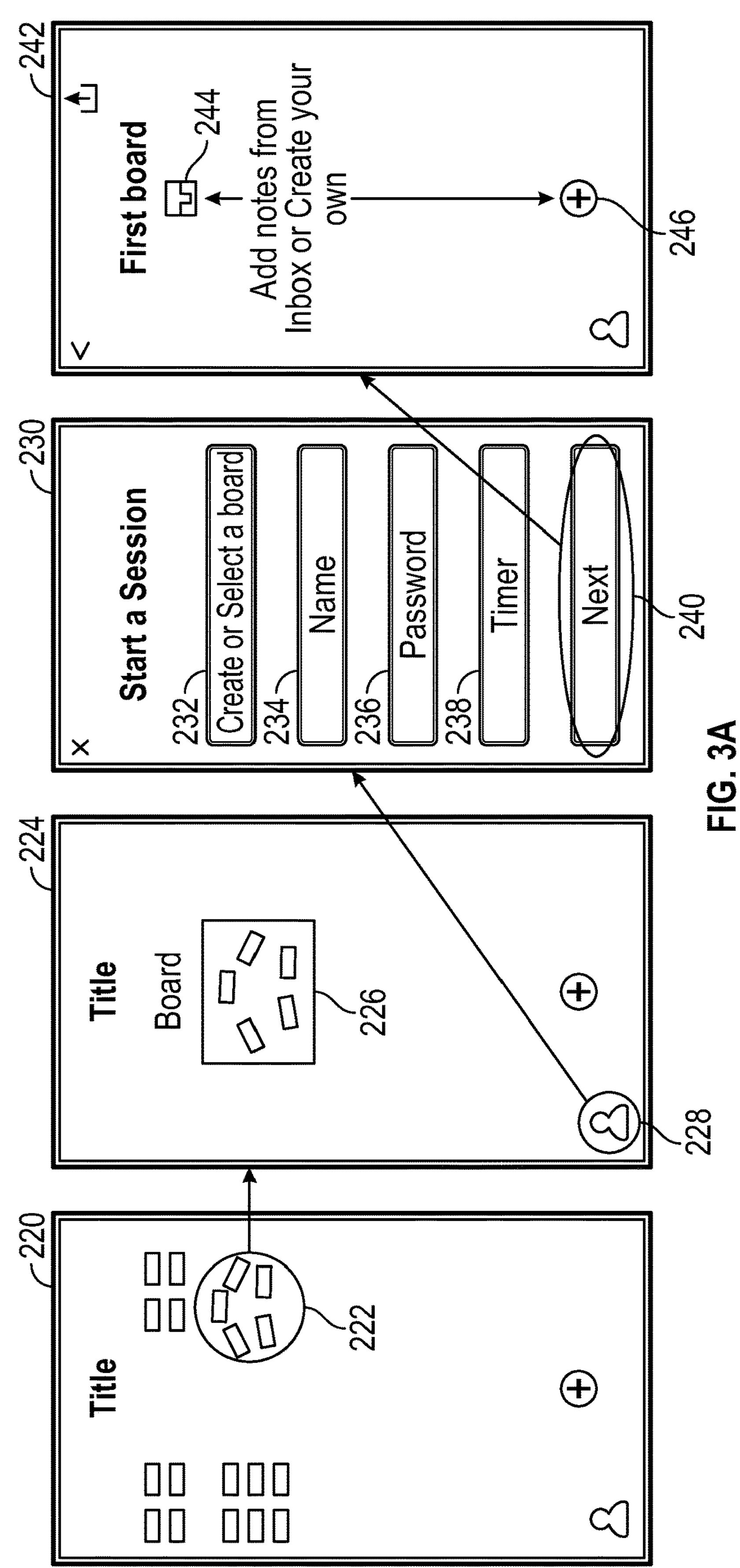
FIG. 3A illustrates user interfaces for starting a collaboration session.
Figure 3B:
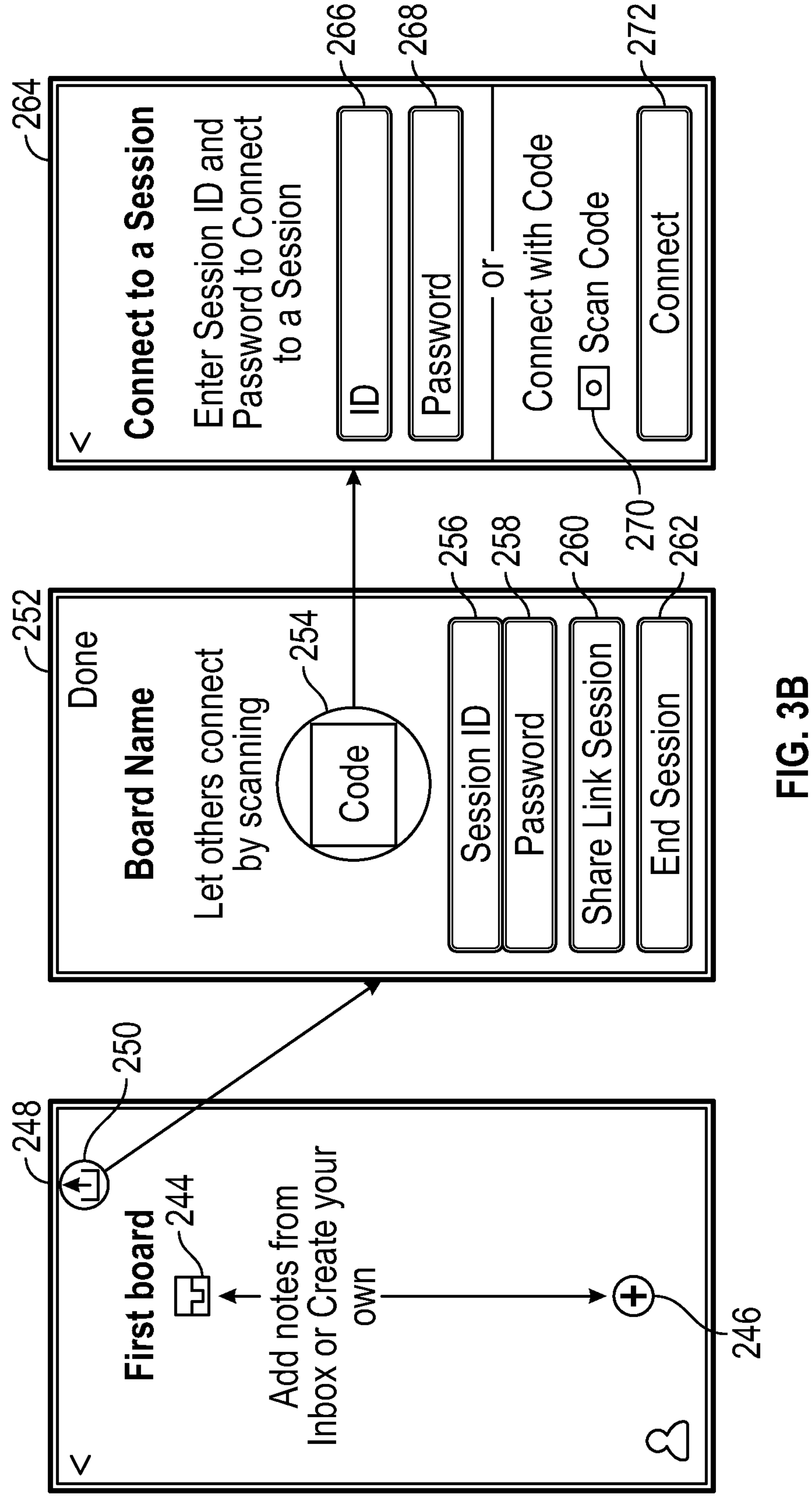
FIG. 3B illustrates user interfaces for sharing and joining a collaboration session.
Figure 3C:
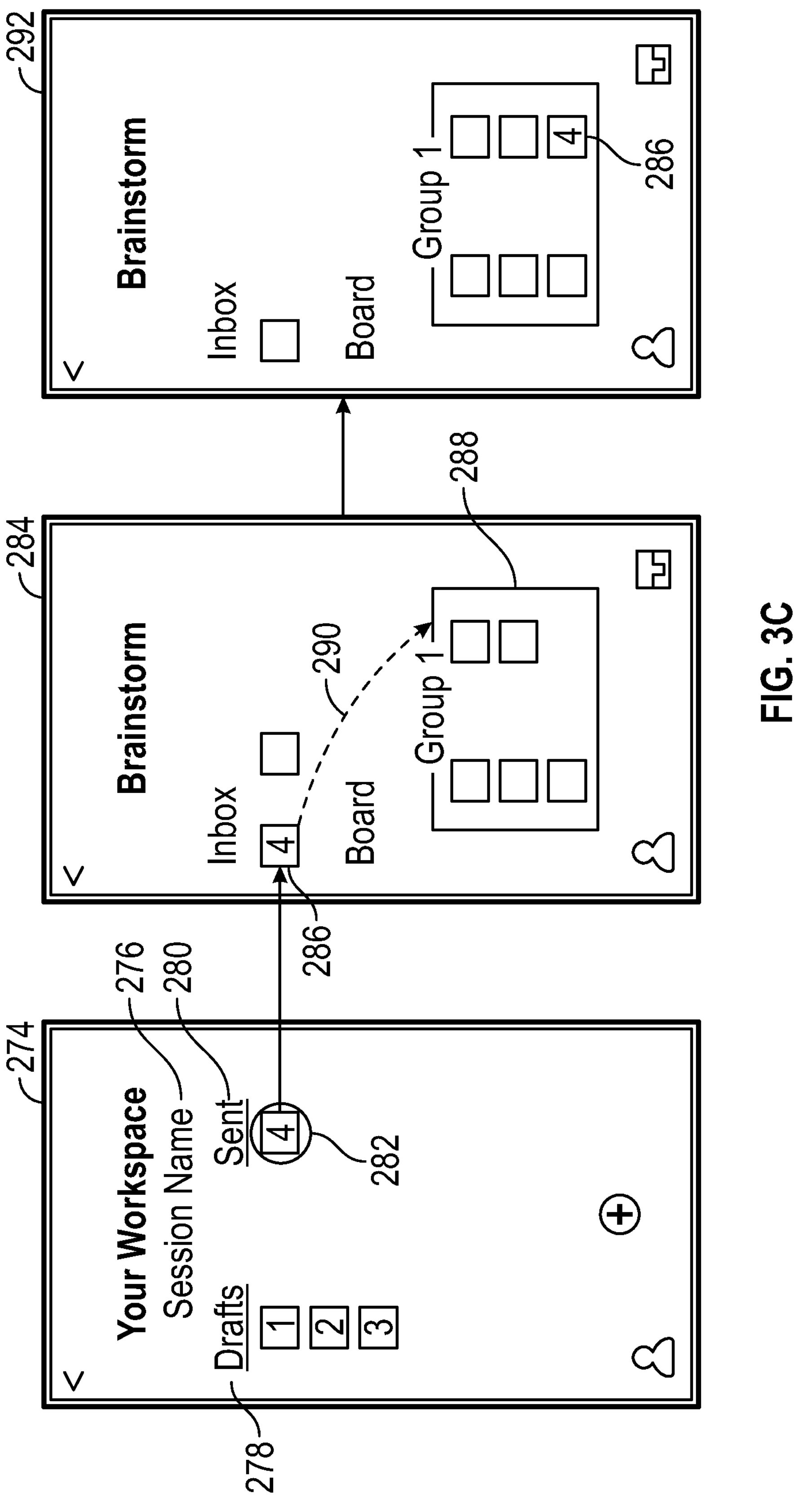
FIG. 3C illustrates user interfaces for conducting a collaboration session.

FIGS. 3A-3C are diagrams of electronic user interfaces (or screens) illustrating the collaboration feature. These user interfaces can be electronically displayed on, for example, presentation device 28 in note management application 78 of mobile device 15.

FIG. 3A illustrates user interfaces for starting a collaboration session. A user interface 220 includes groups of notes including a group 222. A user interface 224 illustrates that a facilitator has selected group 222 as a board for a session, and the notes for that board are displayed as board 226 in user interface 224. To start a session with board 226, the facilitator selects icon 228, which launches or opens a user interface 230 to start the session. User interface 230 includes a section 232 to create or select a board for the session such as board 226, a section 234 to enter a name for the session, a section 236 to enter an optional password for the session, and a section 238 to enter an optional timer for the session. The software application can optionally prefill the session ID. The timer can be implemented with a default timer or a particular time frame set by the facilitator. In addition to or aside from a timer, the session can include date and time stamps for the start and the end of the session.

After entering the information for the session in user interface 230, the facilitator can select Next section 240, which launches or opens a user interface 242 for a first board for the session. The facilitator can add digital notes from the inbox 244 or select the plus icon 246 to create digital notes for the session using a software application to convert physical notes to corresponding digital notes.

FIG. 3B illustrates user interfaces for sharing and joining a collaboration session. User interface 248 displays the first board for the session with notes from the inbox 244 or notes created by selecting the plus icon 246. The facilitator selects icon 250 to share a screen with participants during a video conferencing meeting or other network connection. The facilitator shares a screen having a user interface 252 for participants to join a session. User interface 252 can be generated from, for example, a software application that provides for creating digital notes and converting physical notes to corresponding digital notes. User interface 252 includes a section 254 having a code (e.g., QR code or App Clip code) to join the session, a section 256 having a session ID, a section 258 having a an optional session password, a section 260 having a link to join the session, and a section 262 to end a session. The code can embed a link, for example an Internet web address or uniform resource locator (URL) to provide a network connection between the participants and the facilitator.

A user interface 264 is displayed to participants, for example on their mobile devices, to join a session. User interface 264 includes a section 266 to enter an ID for the session, a section 268 to enter an optional password for the session, and a section 272 for selection to join the session after entering the ID and optional password. The participants can also join a session by using the camera on their mobile devices to scan the code in section 254 (on the facilitator's shared screen) as indicated by camera icon 270, or can join the session by copying and accessing the network link from section 260 in user interface 252. Joining the session can also cause the opening of a software application on the participant devices, where the software application allows the participants to create digital notes or convert physical notes to corresponding digital notes, for example the software application described above in the Note Management System section.

FIG. 3C illustrates user interfaces for conducting a collaboration session. A user interface 274 is displayed to participants after joining the session and allows them to send digital notes to the facilitator. User interface 274 includes a session name 276, a section 278 for drafts of digital notes, and a section 280 for digital notes sent to the facilitator. When this participant sends digital note 282 to the facilitator, the digital note appears as note 286 in the facilitator's inbox. The participants can send the digital notes to the facilitator by performing, for example, a swipe operation on a touch screen display to move the digital note off the user interface or by tapping the digital note on the touch screen display. The digital notes are sent to the facilitator via the network link, for example Internet web address, for the session and are essentially received by the facilitator in real time. The participants work privately on the digital notes, and participants digital notes are only viewable to the other participants after the digital notes are sent to the facilitator and shared with the group. If the participants are sending notes to the facilitator during video conferencing, they can also comment on their own and other participants' digital notes for collaboration.

Participants can create digital notes or convert physical notes to corresponding digital notes using the software application opened when joining the session, for example the software application described above in the Note Management System section. Participants can also create digital notes using an instant communication feature by holding one or more physical notes to a camera on the participants devices for the software application to convert the physical notes to corresponding digital notes.

This instant communication feature is a method to instantly communicate by the way of a physical note, dry erase white board, or other physical product that is viewed through a camera, for example image capture device 18. The camera can be, for example, a web camera, or a computer, cell phone or similar digital device camera. This method allows for faster communication with a group or individual without the need, for example, to log into a system, or perform the activity of typing a note or content to send it digitally through an email system. This method eliminates the need to use a keyboard or cursor control device, allowing a participant to sketch on a whiteboard or physical note, for example, which can be viewed by others after detection via the camera and conversion to a corresponding digital note.

By utilizing the cameras already in use by participants working remotely or on their laptop computers, for example, this instant communication feature creates a way for participants to simply write on a physical note and then hold the note to the camera for capture by the software application and conversion to a corresponding digital note where the digital note can then be added to a digital tool, or sent to the facilitator, for continued collaboration. Participants can also collaborate by pointing a camera at a whiteboard and sketch or add content to the whiteboard to be viewed by the facilitator or other participants as such content is converted to corresponding digital notes that are sent to the facilitator and added to the group. The camera can also be a smart camera turned on and pointing to a dry erase wall in a meeting room. Just placing a physical note on the wall could trigger the camera to automatically capture the note and convert it to a corresponding digital note to share with remote participants.

In one version of this instant communication method, a participant or other user writes on a physical note, holds the physical note up to camera that is already on, and a digital version of note appears in a digital collaboration tool such as the collaboration feature described herein. The physical note can be converted into the corresponding digital note by the software application automatically detecting the presence of a physical note in the camera view and converting the physical note to a corresponding digital note. This conversion can occur as described above in the Note Management System section.

The note can be automatically detected by using machine learning techniques to process video frames in the video feed from the camera (e.g., image capture device 18) in order to recognize an object in the video frames that qualifies as a note. The video frames can be obtained and processed from the video feed on the server side conducting the video conferencing. The video frames can alternatively be obtained and processed on the client side by using a software application as a virtual camera linked to the camera in order to route the video feed through the software application.

Alternatively, a participant or user can scan written text and move the scanned text into a "chat" window in a video conferencing meeting. The written text can include fiduciary marks on the writing surface (e.g., physical note, dry erase board) to require proprietary notes, for example an App Clip, a logo, or any printed graphic design. Another option is for the participant or user to draw a square around a note in a notebook or another writing surface to indicate content to be captured as a note. Also, multiple physical notes can be captured at the same time. Other content that can be captured along with conversion of the physical note to a corresponding digital note includes rich content such as a voice explanation of the physical note a participant is holding in the camera view, and metadata such as an author of the note and possibly a date and time stamp. The captured physical notes can also be used to indicate subsequent action or to organize notes in various categories (e.g., new action item, new idea, or delegate to another)

The term "instant" is only used as a label for this instant communication feature; the conversion of physical notes in camera view to corresponding digital notes typically occurs in real time but need not be instantaneous.

The facilitator can then move digital notes from the inbox to any group within the board for the session, which is shared with the participants. In this example, the facilitator has moved digital note 286 to Group 1 in section 288, as illustrated in user interface 284. The facilitator can move the digital notes to the groups using, for example, a drag and drop operation on a touch screen display to move the digital notes to the group. A user interface 292 illustrates that note 286 has been moved to Group 1 for viewing by the participants via the facilitator's shared screen displaying user interface 292.

The invention claimed is:

1. A method for collaboration using notes, comprising steps of executed by a processor:

starting a session by a facilitator during a video conferencing with participants using at least one of a code, a session ID, and a link;

joining the participants to the session when the participants scan the code with a camera, enter the session ID, or access the link;

receiving by the facilitator digital notes sent from the participants during the session;

moving by the facilitator the digital notes to a group viewable by the participants during the session; and closing the session when the session ends.

2. The method of claim 1, further comprising receiving by the facilitator a board for the group.

3. The method of claim 2, further comprising adding by the facilitator digital notes to the board.

4. The method of claim 2, further comprising receiving by the facilitator another group for the board.

5. The method of claim 4, wherein the moving step comprises moving by the facilitator the digital notes to the another group on the facilitator's screen viewable by the participants during the session.

6. The method of claim 1, wherein the moving step comprises receiving by the facilitator a drag and drop operation to move the digital notes to the group.

7. The method of claim 1, further comprising displaying to each of the participants a section for draft digital notes of the participant and a section for sent digital notes of the participant received by the facilitator.

8. The method of claim 7, further comprising receiving by the participant a digital note created by the participant as one of the draft digital notes.

9. The method of claim 7, further comprising receiving by the participant a digital note corresponding with a physical note scanned by the participant as one of the draft digital notes.

10. The method of claim 1, further comprising receiving by the facilitator a digital note created by the facilitator for the group.

11. The method of claim 10, further comprising displaying within the group the digital note created by the facilitator.

12. The method of claim 1, further comprising receiving by the facilitator a digital note corresponding with a physical note scanned by the facilitator.

13. The method of claim 12, further comprising displaying within the group the digital note corresponding with the physical note scanned by the facilitator.

14. The method of claim 1, further comprising setting a default timer for the session, and wherein the closing step comprises closing the session when the timer expires.

15. The method of claim 1, further comprising receiving by the facilitator a timer for the session, and wherein the closing step comprises closing the session when the timer expires.

16. The method of claim 1, wherein the joining step comprises opening a software application for the participants to create the digital notes.

17. The method of claim 1, further comprising automatically detecting a physical note via an image capture device of one of the participants and converting the detected physical note to a corresponding digital note.

18. The method of claim 1, further comprising sending the digital notes to the participants when the session ends or after the session ends.

19. A system for collaboration using notes, comprising a processor configured to execute of the method of claim 1.

* * * * *